Figure 1:
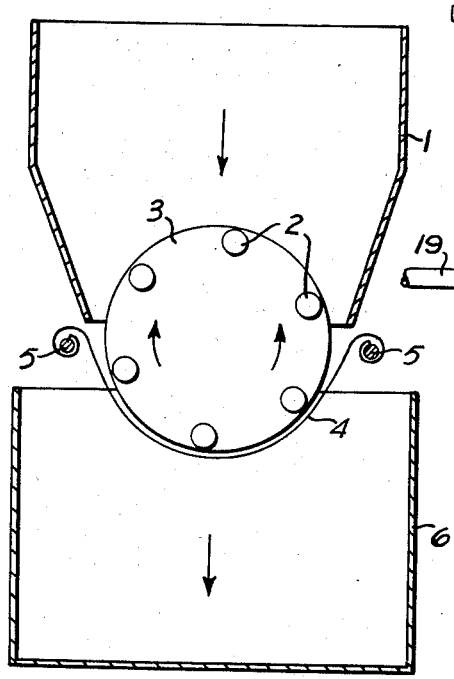

Oct. 13, 1959     H. A. RYAN     2,908,610
PROCESS FOR MANUFACTURE OF SENNA PRODUCTS
Filed May 12, 1954

Inventor:
Herbert Alan Ryan
By his attorneys:
Baldwin & Wight

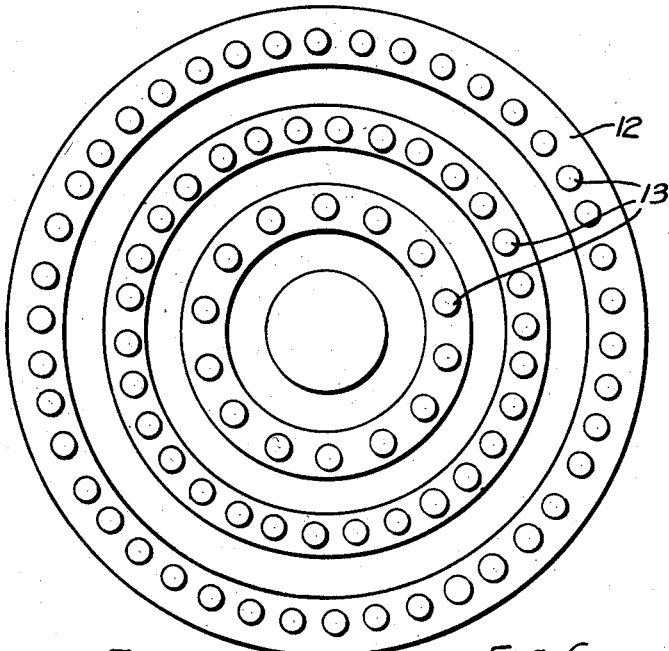
FIG. 5.   FIG. 6.
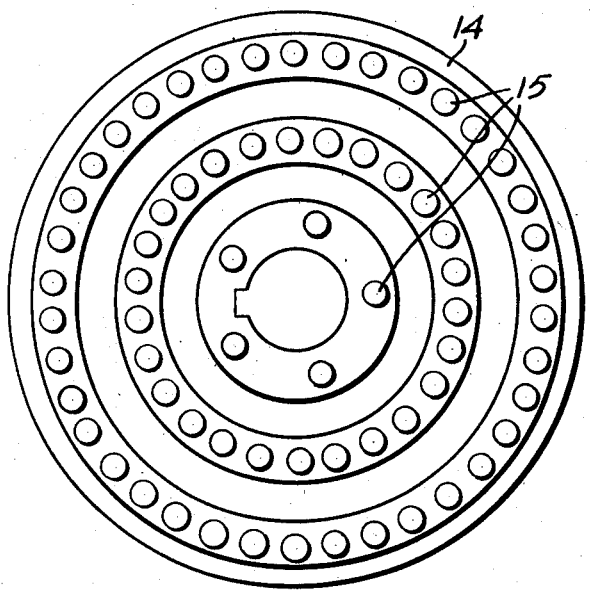

United States Patent Office 2,908,610
Patented Oct. 13, 1959

2,908,610

PROCESS FOR MANUFACTURE OF SENNA PRODUCTS

Herbert Alan Ryan, Bedford Park, London, England, assignor, by mesne assignments, to Senokot Pharmaceutical Products Corp., Yonkers, N.Y., a corporation of New York Application May 12, 1954, Serial No. 429,347

3 Claims. (Cl. 167—56)

Senna pods have been in use as a laxative for over one thousand years, the principal method of administration being to soak them in water for several hours and then to pour off and drink the resulting infusion or "senna tea."

In more modern times, in addition to this domestic procedure of obtaining the laxative effect of the pods, various extracts have been made commercially for the greater convenience of both dispensers and users. These extracts are usually in liquid form and are prepared by first extracting the pods with cold water by maceration or percolation, then separating the macerate or percolate and finally concentrating these fluids by heat under reduced pressure. They are either used as such or are incorporated into various medicinal forms such as, for example, pastilles and lozenges.

As no method of assay was available it was not possible to determine what proportion of the activity of the drug had been extracted or how the extracts (or the preparations in which they had been incorporated) kept on storage.

With the recent development of both a biological and a chemical method of assay (T. C. Lou, J. Pharm. Pharmacol., 1949, 1, 673; J. W. Fairbairn and I. Michaels, J. Pharm. Pharmacol., 1950, 2, 807, 813) it was established that senna extracts of commerce contained much less activity than the stated proportion of drug from which they had been made. They ranged from 30% down to as low as 1% of the potency they should have possessed having regard to the amount of senna used.

In order to appreciate why these extracts are so defective it is necessary to study the chemical and physical properties of the active principles which are responsible for the laxative effect of the drug. Much research has been carried out by many workers to identify these principles and it has been known for a long time that the main active principles are glycosides of the anthraquinone series, but the most important advance in their characterisation has taken place only in recent years. A. Stoll, B. Becker and W. Kussmaul, Helv. Chim. Acta, 1949, 32, 1892, isolated the two principal active glycosides and identified them as derivatives of rhein (1,8 dihydroxy anthraquinone-3-carboxylic acid) which they named sennoside A and sennoside B. These occur in varying proportions in the drug as free glycosides and also in combination as their salts. In water, sennoside A is almost insoluble, sennoside B only slightly soluble, whilst their salts, sodium, calcium, etc. are much more soluble. Sennosides are subject to hydrolytic decomposition and are sensitive to the action of acids, alkalis and certain enzymes, especially under the influence of heat.

A third active anthracene glycoside has been reported by Fairbairn and Saleh, J. Pharm. Pharmacol., 1951, 3, 918, who, although not specifying it, have found that it occurs in much less proportion in the drug than the sennosides, with which it reacts synergistically. It is soluble in hot water when a 4% infusion is made, but owing to its thermolabile nature and deterioration in the presence of water it does not exist in liquid extracts of commerce. These workers have also reported that the sennosides and the third active glycoside together do not account for the whole of the laxative activity of the drug: a further active factor is present which they have also shown to be absent from liquid extracts of senna as normally prepared.

In view of this, and as a result of our investigations we can state that the low potency values of senna extracts are due to:

(1) Incomplete extraction of the glycosides from the drug, due to the comparative insolubility of the uncombined sennosides.

(2) Loss of activity by decomposition of the active principles during concentration, by heat under reduced pressure, of the extraction liquors.

(3) Gradual loss of activity by decomposition of the active principles whilst the extracts are in storage.

It is obvious, therefore, that these extracts are an inefficient and wasteful means of obtaining the activity of senna pods, whilst the uncertainty as regards their laxative effect has rendered them unsatisfactory for administration since accurate dosage is impossible. This is of much clinical importance since consideration of the manner in which senna functions as a laxative indicates what a valuable therapeutic agent this drug is. Until comparatively recently it was generally held that the anthracene laxatives passed through the digestive tract to reach the large intestine unchanged, because conditions in the small bowel were unfavourable to the solution of the glycosides. Now it has been shown (W. Straub and E. Triendl, Arch. exp. Path. Pharmak., 1937, 185, 1; T. Okada, Tohoku J. exp. Med., 1940, 38, 33) that absorption does take place in the small intestine and that the active principles reach the colon through the blood stream. Until they arrive in this situation the senna principles exert no pharmacological effect either locally on the digestive tract or systemically. The substances which stimulate peristalsis are produced in the colon itself by the action of the *B. coli* enzymes on the senna glycosides, and the stimulating action is a neuromuscular one mediated through Auerbach's plexus. This reproduction of the physiological process of normal defaecation is of considerable clinical importance in giving to senna a re-educative action in cases of chronic constipation. A convenient means, therefore, of rendering the active constituents of senna available in the balanced proportions in which they occur naturally in the drug would enable the full advantages of senna to be obtained and widely applied.

The object of the present invention is to produce by mechanical means a stable concentrate of senna pods containing the active principles as they occur naturally in the drug, of known potency, in a form convenient to use, and suitable for internal use in any of the usual medicinal forms such as powders, compressed or moulded tablets, pastilles, lozenges, granules, chewing gum and the like, or in any edible product such as chocolate, biscuits, and the like.

We have carried out researches with a view to find if the active principles are concentrated in a particular part of the pod in relation to the whole, and have discovered that (1) By far the greater part of the activity is concentrated in the outer epidermis of the pericarp.

(2) The outer epidermis, which is somewhat brittle in character, tends to flake away in small pieces from the thin, tough layer of the inner epidermis or endocarp to which it is attached.

(3) The seeds contain no activity at all.

As a result of these discoveries we have developed a method of manufacture which achieves our object and which consists, in the first stage in taking senna pods and separating the pericarp from the seeds, discarding the latter which we have shown by experiment to be biologically inactive. In the next stage of the manufacture, the separated pericarp is subjected to a process of beating which causes the greater part of the outer epidermis to become detached from the inner layer and break up into small pieces. Finally, the separated outer epidermis is ground to a fine powder.

Separating and discarding the seeds and the main part of the inner epidermis from the pods results in the following advantages:

(1) A concentrate is obtained which contains more than twice the proportion of active glycosides present in the original pods. This is many times stronger than any of the pharmaceutical extracts obtained by solvent extraction to which we have previously referred.

(2) Removal of waste matter of no therapeutic value.

Figure 3:
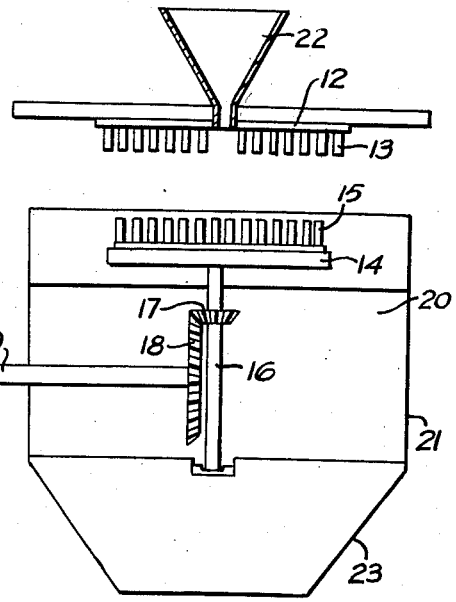
Figure 2:
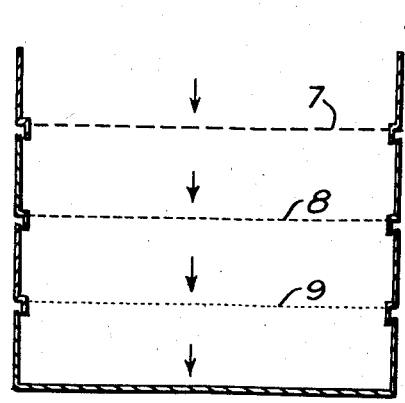
Figure 4:
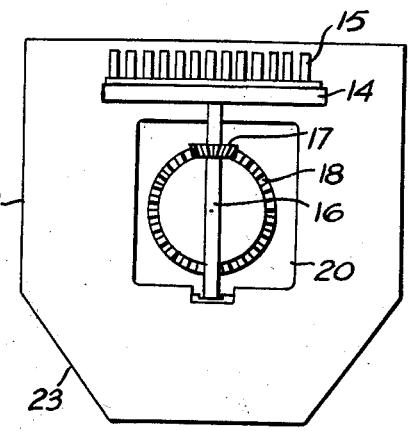

The following example is given to show how the invention may be carried out in practice and, for the purpose of illustration, the accompanying drawings show, very diagrammatically, certain apparatus which may be used. In the drawings:

Figure 1 is a side elevation of a first beating machine;
Figure 2 shows sieving apparatus in elevation;
Figure 3 is a side elevation of the essential parts of the second beating machine;
Figure 4 is a front elevation of the machine shown in Figure 3; and
Figures 5 and 6 show, on an enlarged scale, plan views of parts shown in Figure 3.

Senna pods of known glycosidal content are first picked over to remove foreign matter which is normally present in small proportions. The cleaned pods, which usually contain about 8% to 10% of moisture, are then stored in a low humidity room at atmospheric temperature to reduce their moisture content to about 7.5%. This partial drying renders them more firm and crisp and conditions them for the first beating machine through which they are next passed in order to break them apart to free the seeds. This machine, see Figure 1, is provided with a hopper 1 into which the partially dried pods are fed, mounted over a horizontal rotor comprising six evenly spaced rods 2, carried at their ends by rotatably mounted discs of which one is shown at 3. This rotor is adapted to oscillate at about 40 oscillations a minute over a screen 4. This screen is a wire mesh having 2 holes per inch and is positioned immediately below the rotor, close to and almost touching it. The edge portions of the screen are anchored to horizontal bars 5 which may be provided with a ratchet and pawl device to enable the tension and disposition of the screen to be adjusted. Under the screen is a receptacle 6.

In this machine the pods are torn up between the rotor and the screen by the beating and tearing action of the rods oscillating adjacent to the screen, and are forced through the latter, the pericarp being broken mainly into fairly large pieces and a lesser amount of small pieces containing a relatively high proportion of outer epidermis due to some flaking away of the latter at this stage, whilst practically the whole of the seeds are released in an unbroken condition.

The next stage is to separate the valueless seeds from the broken pericarp. For this purpose a multiple sieve separator, such as is illustrated in Figure 2, is used, the separator being provided with vibrating means not shown. The separator has three sieve screens, 7, 8 and 9, the first having a mesh of five holes per inch, the second ten holes per inch and the third twenty holes per inch. The larger pieces of pericarp are retained on the five-hole mesh screen and may be called fraction 1, the smaller pieces and the seeds passing through this mesh and falling on to the ten-hole mesh 8. The material retained on the screen 8 may be called fraction 2. It consists mainly of the seeds. That part of the pericarp which passes through the ten-hole mesh screen 8 and which is retained on the twenty-hole mesh screen 9 may be called fraction 3 whilst the coarse powdery material which passes through the twenty-hole mesh screen 9 and which contains the relatively high proportion of the active glycosides may be called fraction 4. This fraction 4 is held in reserve to be mixed with a fraction obtained by a further operation to be hereinafter described.

Fraction 1 is now mixed with fraction 3 and passed into a second beating machine, illustrated by Figures 3–6.

From 100 parts by weight of broken pods about 65 parts by weight are contained in the mixture of fractions 1 and 3, although it will be understood that these proportions may vary in practice. About 10 parts of the weight are in fraction 4 which is being held in reserve.

The second beating machine comprises a stationary disc 12 carrying rings of pins 13 and a rotary disc 14 carrying rings of pins 15. The arrangements of pins on these discs are respectively shown in the plan views thereof in Figures 5 and 6. In Figure 3 the discs are shown spaced apart but in operation the disc 12 is lowered so that its pins 13 extend alongside the pins 15 of disc 14.

Mechanism for rotating the disc 14 comprises a shaft 16, bevel gearings 17, 18 and a driving shaft 19. This mechanism is mounted in a casing 20 which bridges across the inside of a housing 21.

In operation the mixed fractions 1 and 3 are fed into a hopper 22 so as to pass between the pins of the stationary disc 12 and the pins of the rotating disc 14 whereby they are subjected to beating and tearing which causes the greater part of the outer epidermis of the pericarp to be flaked away whilst the bulk of the relatively tough inner epidermis of the pericarp, although reduced in size, is still left in comparatively large pieces. The treated material descends through a bottom chute 23 into a suitable receptacle whence the material is taken to a vibratory sieve having a screen of twenty holes per inch mesh. The material retained on this screen is principally inner epidermis and this, not being required, is discarded. The powdery flaked material passing through the screen and which may be called fraction 5 is a concentrate rich in active principles because of the high proportion of outer epidermis that it contains. Finally fraction 4 and fraction 5 are mixed and ground to a fine powder.

The yield of the finely powdered concentrate which results is about 35 parts by weight out of the 100 parts by weight of the original pods. It contains more than twice the concentration of active principles present in the original material.

It will be appreciated that the example of working which has just been described and the apparatus as illustrated are simply exemplary and that other means may be used for carrying the invention into effect.

As we have previously stated, powdered concentrate of senna is suitable for internal use in any of the usual medicinal forms, and the following example illustrates one instance of how we may incorporate with it other ingredients as flavouring and sweetening to produce a highly palatable product that is stable over long periods and the dosage of which can be carefully controlled. 5.25 parts by weight of powdered concentrate of senna pods are mixed with 10.5 parts by weight of cocoa powder, 46.55 parts by weight of sucrose, 0.17 part by weight of vanillin and 0.02 part by weight of saccharin, and then wetted with a mixture of 6.9 parts by weight of extract of malt dissolved in 4.1 parts by weight of water. The wetted mass is passed through a sieve having 7 holes per inch, the resulting granules being dried at about 45° C. After 68 parts by weight of dry granules are obtained which are stored in well sealed containers. If desired, a non-toxic wetting agent may be incorporated in small proportions to enable more rapid dispersion of the granules when mixed for use with a liquid vehicle such as water or milk. Clinical trials have shown that this granule provides a constant laxative action, and individual patients can easily determine the amount they require.

What is claimed is:

1. Process for the manufacture of senna products, comprising the steps of separating the pericarp of substantially dry senna pods from the seeds thereof, dividing the pericarp into fractions, one of which consists largely of the outer epidermis and the other of which consists largely of the inner epidermis, rejecting the latter fraction and the seeds, and reducing the former fraction to a powder to constitute the required product.

2. Process for the manufacture of senna products, comprising the steps of coarsely breaking up substantially dry senna pods, releasing the seeds, substantially unbroken, separating the seeds from the main bulk of the pericarp and rejecting them, beating the pericarp so as to flake off the greater part of the outer epidermis of the pericarp into relatively small pieces and to leave the greater part of the relatively tough inner epidermis in relatively large pieces, separating the flaked away outer epidermis from the larger pieces of inner epidermis, discarding the latter, and grinding the former to a fine powder to constitute the required product.

3. Process for the manufacture of senna products, comprising the steps of coarsely breaking up substantially dry senna pods, releasing the seeds, substantially unbroken, separating the seeds from the main bulk of the pericarp and rejecting them, separating from said main bulk of the pericarp a small quantity of powdery material resulting from said breaking up step, beating the remainder of said main bulk of the pericarp so as to flake off the greater part of the outer epidermis of the pericarp into relatively small pieces and to leave the greater part of the relatively tough inner epidermis in relatively large pieces, separating the flaked away outer epidermis from the larger pieces of inner epidermis, discarding the latter, mixing the former with said powdery material, and grinding the mixture to a fine powder to constitute the required product.

References Cited in the file of this patent

UNITED STATES PATENTS

| 375,706 | Hoppel | Dec. 27, 1887 |
| 1,598,348 | Hickey | Aug. 31, 1926 |
| 1,912,472 | Bryan | June 6, 1933 |
| 2,221,802 | Keys | Nov. 19, 1940 |
| 2,355,028 | Musher | Aug. 1, 1944 |

FOREIGN PATENTS

| 683,990 | Great Britain | Dec. 10, 1952 |

OTHER REFERENCES

Stockman: Chem. and Drug., 1951, p. 156.
U.S. Dispensatory, 24th ed., 1947, pp. 1024, 1025.